(12) United States Patent
Wang

(10) Patent No.: US 8,248,769 B2
(45) Date of Patent: Aug. 21, 2012

(54) CONNECTING MECHANISM AND ELECTRONIC DEVICE UTILIZING THE SAME

(75) Inventor: Peng Wang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 215 days.

(21) Appl. No.: 12/860,940

(22) Filed: Aug. 23, 2010

(65) Prior Publication Data

US 2011/0242741 A1 Oct. 6, 2011

(30) Foreign Application Priority Data

Mar. 31, 2010 (CN) .......................... 2010 1 0137103

(51) Int. Cl.
*G06F 1/16* (2006.01)
(52) U.S. Cl. .................................. 361/679.01; 403/375
(58) Field of Classification Search ............. 361/679.01; 403/375
See application file for complete search history.

(56) References Cited

U.S. PATENT DOCUMENTS

| 6,152,157 | A  | * | 11/2000 | Jang ............................... 135/131 |
| 7,751,181 | B2 | * | 7/2010  | Chen ......................... 361/679.01 |
| 2006/0133019 | A1 | * | 6/2006  | Yamazaki et al. ............ 361/683 |
| 2008/0186661 | A1 | * | 8/2008  | Hsu ............................... 361/681 |
| 2009/0021896 | A1 | * | 1/2009  | Kim ............................... 361/679 |
| 2011/0228453 | A1 | * | 9/2011  | Wang ....................... 361/679.01 |

\* cited by examiner

*Primary Examiner* — Lisa Lea Edmonds
(74) *Attorney, Agent, or Firm* — Altis Law Group, Inc.

(57) ABSTRACT

A connecting mechanism for connecting a first housing and a second housing together is provided. The second housing defines a slot and two holes at opposite ends of the slot and communicating with the slot. The connecting mechanism includes two fixing elements fixed on the first housing, two rings and a movable element connected to the two fixing elements through the two rings and is capable of moving between a substantially horizontal orientation and a substantially vertical orientation. To connect the first housing and the second housing together, the second housing is moved to cause the movable element to pass through the slot until part of each of the two rings is received in the hole. The movable element is moved relative to the two rings to prevent the two rings from disengaging from the second housing.

12 Claims, 4 Drawing Sheets

CONNECTING MECHANISM AND ELECTRONIC DEVICE UTILIZING THE SAME

BACKGROUND

1. Technical Field

The present disclosure relates to connecting mechanisms and, particularly, to a connecting mechanism and an electronic device including a first housing and a second housing connected together by the connecting mechanism.

2. Description of Related Art

The use of a fastener mechanism to allow two separate articles to be operatively engaged is well known. An auxiliary tool such as screwdriver is usually used to fasten/loosen a fastener mechanism. When there is no screwdriver at hand, a user may not be able to operate the fastener mechanism.

Therefore, what is needed is a new connecting mechanism which can overcome the described shortcoming.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean at least one.

Figure 1:
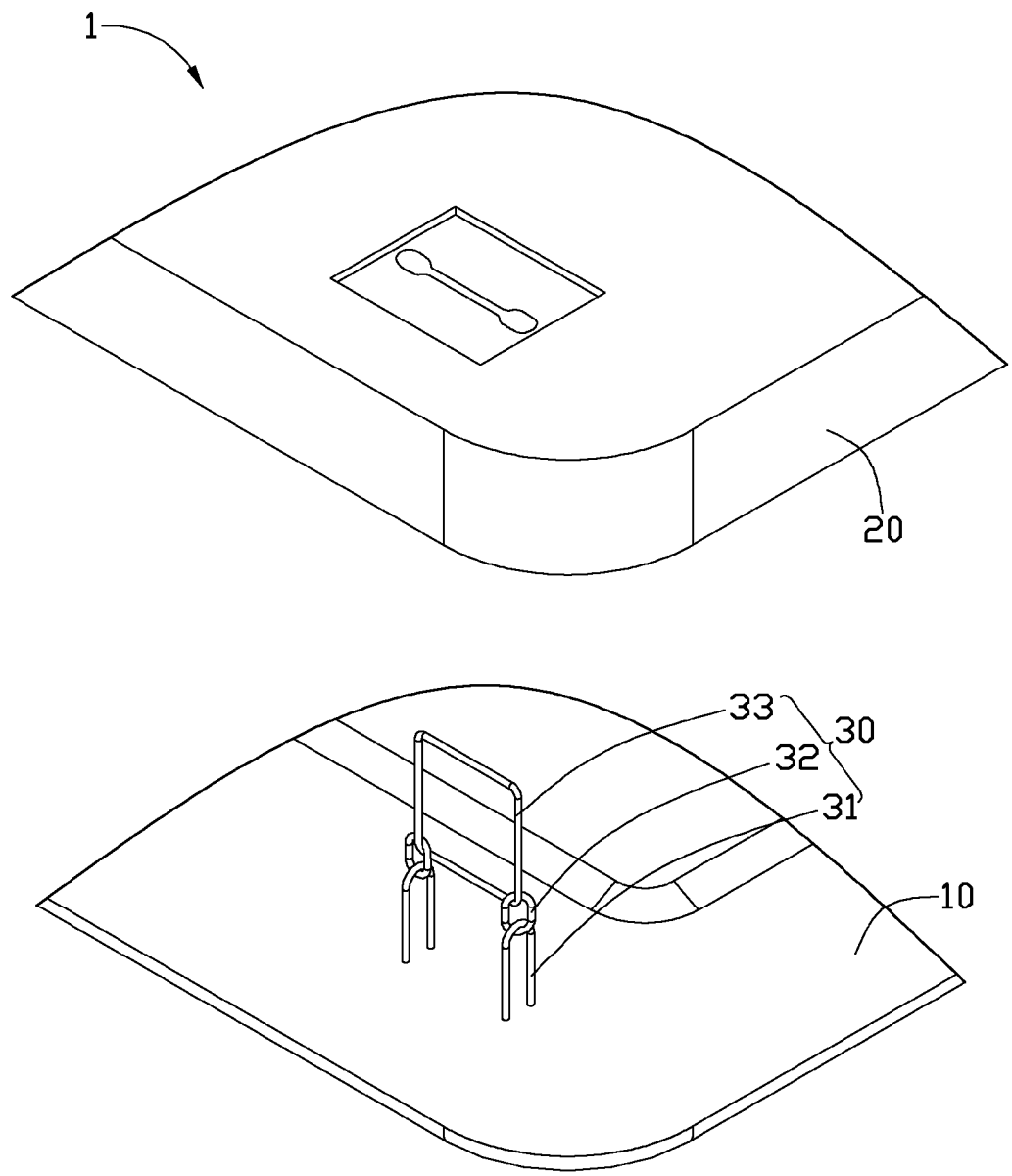
FIG. 1 is a partial, isometric view of an electronic device including a connecting mechanism in accordance with an exemplary embodiment, showing the connecting mechanism in a first state.

Referring to FIG. 1, in an exemplary embodiment, an electronic device 1 includes a first housing 10, a second housing 20, and a connecting mechanism 30 for connecting the first housing 10 and the second housing 20.

Figure 2:
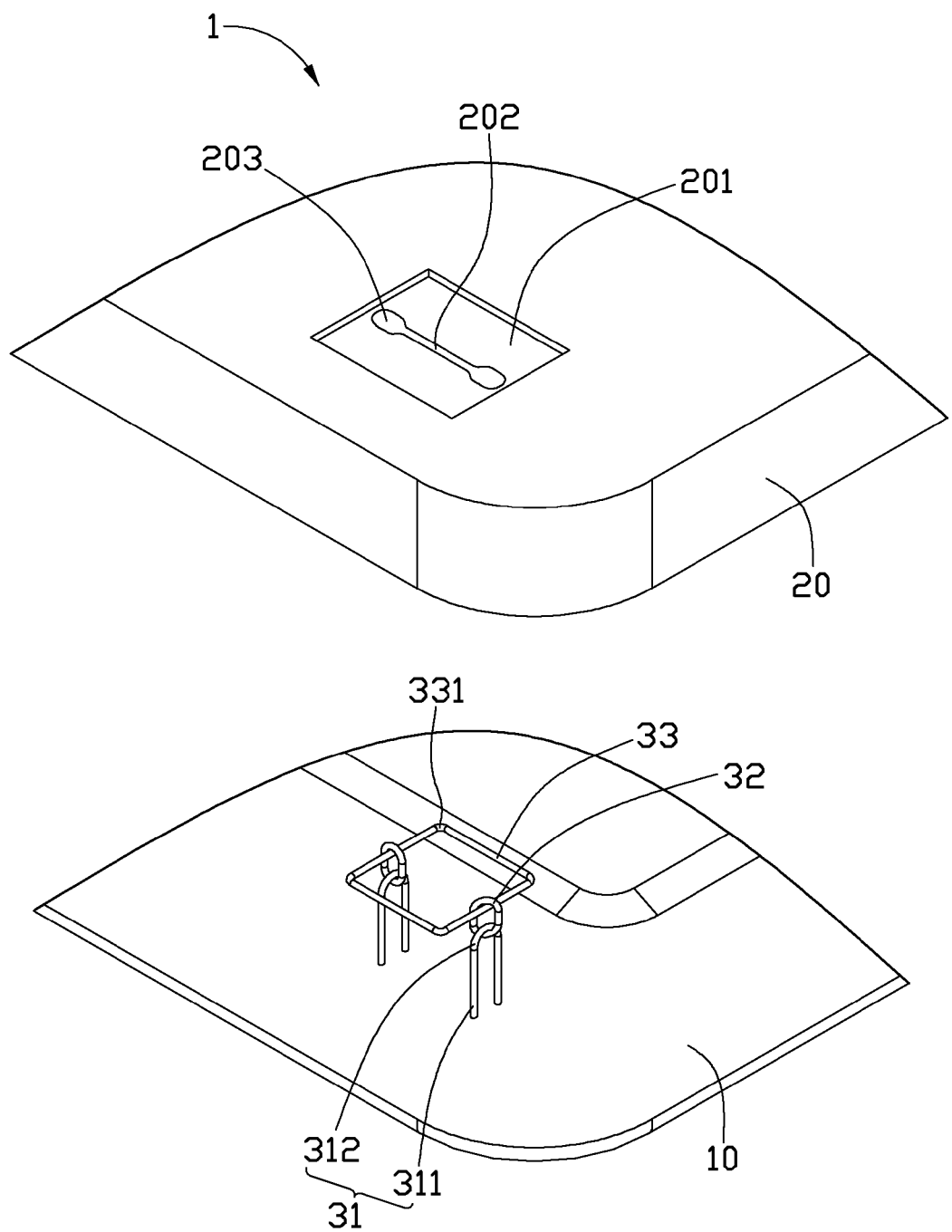
FIG. 2 is similar to FIG. 1, but showing the connecting mechanism in a second state.

Referring to FIG. 2, the second housing 20 includes a recessed portion 201 defining a slot 202 and two holes 203 at opposite ends of the slot 202. The two holes 203 communicate with the slot 202.

The connecting mechanism 30 includes two fixing elements 31 fixed on the first housing 10, two rings 32, and a movable element 33. Each fixing element 31 can be a substantially arch shaped, and includes a curved connecting portion 312 and two substantially parallel fixing portions 311. One end of each fixing portion 311 is connected to one end of the connecting portion 312, and another end is fixed to the first housing 10, thereby fixing the fixing element 31 to the first housing 10. The movable element 33 is substantially a square frame, and includes four rounded corners 331. In the embodiment, the movable member 33 is substantially rectangular. The movable element 33 is connected to the two fixing elements 31 via the two rings 32, and can move freely between a substantially horizontal orientation and a substantially vertical orientation. The outer diameter of each ring 32 is greater than the diameter of the hole 203. The width of the movable element 33 equals to the sum of the outer diameter of the ring 32 and the length of the slot 202.

Figure 3:
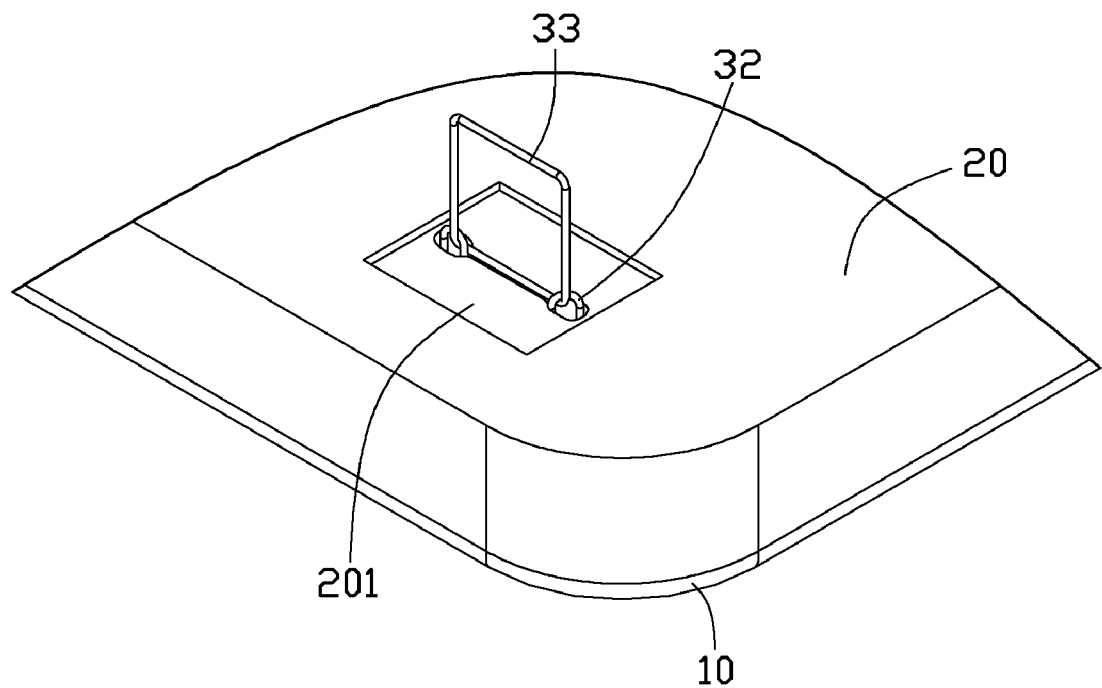
FIG. 3 is a schematic view of the connecting mechanism, in the first working state.
Figure 4:
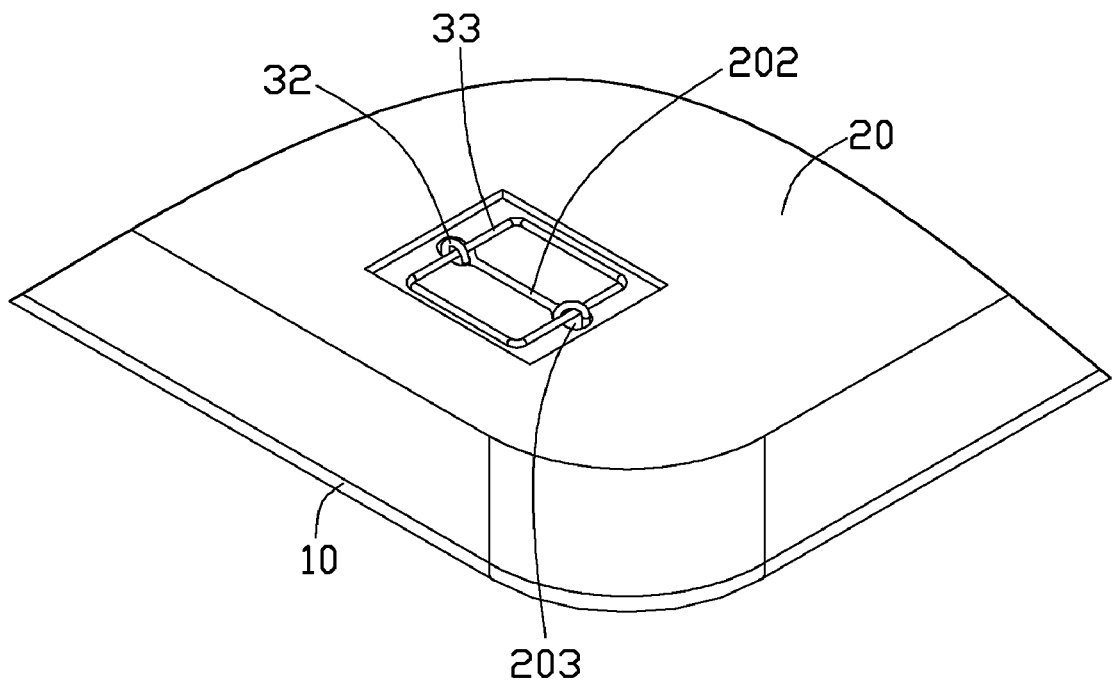
FIG. 4 is similar to FIG. 3, but showing the connecting mechanism in the second working state.

Referring to FIGS. 3-4, when attempting to connect the first housing 10 to the second housing 20, the movable element 33 is first orientated to be substantially vertical. The second housing 20 is then moved to cause the movable element 33 to pass through the slot 202 until part of each of the two rings 32 is received in the hole 203. Because the outer diameter of each ring 32 is greater than the diameter of the hole 203, the ring 32 cannot pass through the hole 203. The movable element 33 is then moved relative to the two rings 32 to prevent the two rings 32 from disengaging from the second housing 20 and rests on the bottom of the recessed portion 201, thereby connecting the first housing 10 to the second housing 20. In order to strengthen the connection between the first housing 10 and the second housing 20, the user can move the movable element 33 until the two rings 32 are located at the middle of opposite sides of the movable element 33.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A connecting mechanism for connecting a first housing and a second housing together, the second housing defining a slot and two holes at opposite ends of the slot and communicating with the slot, the connecting mechanism comprising:
   two fixing elements fixed on the first housing;
   two rings; and
   a movable element connected to the two fixing elements through the two rings and capable of moving between a substantially horizontal orientation and a substantially vertical orientation;
   wherein, to connect the first housing and the second housing together, the movable element is first orientated to be substantially vertical, the second housing is then moved to cause the movable element to pass through the slot until part of each of the two rings is received in one of the two holes, the movable element is moved relative to the two rings to prevent the two rings from disengaging from the second housing.

2. The connecting mechanism as described in claim 1, wherein each of the two fixing elements is substantially arch shaped.

3. The connecting mechanism as described in claim 2, wherein each of the two fixing elements comprises a curved connection portion and two substantially parallel fixing portions, one end of each fixing portion is connected to one end of the connection portion, and another end is fixed to the first housing.

4. The connecting mechanism as described in claim 2, wherein the movable element is a substantially square frame, and comprises four rounded corners.

5. The connecting mechanism as described in claim 1, wherein the outer diameter of each ring is greater than the diameter of each of the two holes.

6. The connecting mechanism as described in claim 1, wherein the width of the movable element equals to the sum of the outer diameter of the ring and the length of the slot.

7. An electronic device comprising:
   a first housing;
   a second housing defining a slot and two holes at opposite ends of the slot and communicating with the slot; and
   a connecting mechanism configured for connecting the first housing and the second housing together, and the connecting mechanism comprising:
   two fixing elements fixed on the first housing;
   two rings; and a movable element connected to the two fixing elements through the two rings and callable of moving between a substantially horizontal orientation and a substantially vertical orientation;

wherein, to connect the first housing and the second housing together, the movable element is first orientated to be substantially vertical, the second housing is then moved to cause the movable element to pass through the slot until part of each of the two rings is received in one of the two holes, the movable element is moved relative to the two rings to prevent the two rings from disengaging from the second housing.

8. The connecting mechanism as described in claim 7, wherein each of the two fixing elements is substantially arch shaped.

9. The connecting mechanism as described in claim 8, wherein each of the two fixing elements comprises a curved connection portion and two substantially parallel fixing portions, one end of each fixing portion is connected to one end of the connection portion, and another end is fixed to the first housing.

10. The connecting mechanism as described in claim 7, wherein the movable element is a substantially square frame, and comprises four rounded corners.

11. The connecting mechanism as described in claim 7, wherein the outer diameter of each ring is greater than the diameter of each of the two holes.

12. The connecting mechanism as described in claim 7, wherein the width of the movable element equals to the sum of the outer diameter of the ring and the length of the slot.

* * * * *